(12) United States Patent
Cho et al.

(10) Patent No.: US 10,150,689 B2
(45) Date of Patent: Dec. 11, 2018

(54) APPARATUS FOR FABRICATING MATERIALS

(71) Applicant: LG Electronics Inc., Seoul (KR)

(72) Inventors: Chang Min Cho, Seoul (KR); Dongil Lee, Seoul (KR); Han Jong Yoo, Seoul (KR); Jin Hyuk Lee, Seoul (KR); Changshik Minn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 3 days.

(21) Appl. No.: 15/651,725

(22) Filed: Jul. 17, 2017

(65) Prior Publication Data
US 2018/0016178 A1   Jan. 18, 2018

(30) Foreign Application Priority Data
Jul. 18, 2016   (KR) .......................... 10-2016-0090485

(51) Int. Cl.
*C03B 23/03*   (2006.01)

(52) U.S. Cl.
CPC ...... *C03B 23/0302* (2013.01); *C03B 2215/50* (2013.01); *C03B 2215/80* (2013.01)

(58) Field of Classification Search
CPC . C03B 23/03; C03B 23/0302; C03B 2215/50; C03B 2215/60; C03B 2215/78; C03B 2215/80
USPC .......................................................... 65/243
See application file for complete search history.

(56) References Cited

U.S. PATENT DOCUMENTS

| | | | | |
|---|---|---|---|---|
| 5,851,254 A * | 12/1998 | Fukuda | ..................... | C03B 7/14 65/35 |
| 6,141,991 A * | 11/2000 | Fujimoto | ................ | C03B 11/08 425/344 |
| 7,101,503 B2 * | 9/2006 | Spengler | ................. | B29C 43/36 264/250 |
| 7,926,303 B2 * | 4/2011 | Chang | ................... | B29C 43/021 264/2.7 |
| 2003/0145626 A1* | 8/2003 | Rees | ....................... | C03B 11/08 65/102 |
| 2006/0021386 A1* | 2/2006 | Wang | ...................... | C03B 11/08 65/323 |
| 2012/0216573 A1* | 8/2012 | Dannoux | ............ | C03B 23/0258 65/104 |
| 2014/0367027 A1* | 12/2014 | Roh | ..................... | C03B 23/0302 156/99 |

(Continued)

*Primary Examiner* — Cynthia Szewczyk
(74) *Attorney, Agent, or Firm* — Birch, Stewart, Kolasch & Birch, LLP

(57) ABSTRACT

Provided is apparatus for fabricating materials, including: a first mold including a first forming unit pressing a first material, and a second forming mold arranged at a bottom surface of the first forming unit to have an opening exposing the first material and to form at least a part of the first material by being meshed at a part with the first forming unit; a second mold arranged at a bottom surface of the first mold to support a second material; and an interlocking mold including a fixing unit interposed between the first and second molds to fix the second material arranged at the second mold by pressing the second material, and an interlocking unit ascendably and descendibly coupled to the fixing unit to form the second material by pressing the second material in association with the forming of the first material.

15 Claims, 5 Drawing Sheets

(56) References Cited

U.S. PATENT DOCUMENTS

2014/0373573 A1* 12/2014 Hwang ............... C03B 35/202
  65/104
2017/0349472 A1* 12/2017 Jung ................ C03B 23/0302

* cited by examiner

APPARATUS FOR FABRICATING MATERIALS

CROSS-REFERENCE TO RELATED APPLICATION

Pursuant to 35 U.S.C. § 119 (a), this application claims the benefit of earlier filing dates and rights of priority to Korean Patent Application No.: 10-2016-0090485 filed on Jul. 18, 2016, the contents of which are hereby incorporated by reference in their entirety.

FIELD OF THE INVENTION

The present disclosure relates to apparatus for fabricating materials.

DESCRIPTION OF RELATED ART

In general, in order to process a material such as glass in a desired shape, a widely used method is that of press-forming a material having a low hardness by being heated in a mold. Although a method of forming one material in one mold device in order to process a material in a mold is widely used, a method of simultaneously forming two materials in one mold device is recently developed.

In order to simultaneously form two materials in one mold device, a material is arranged between a middle mold and an upper mold, or a material is arranged between a middle mold and a bottom mold, and then, the upper mold and bottom mold are moved toward the middle mold to simultaneously press-form the two materials.

However, when two materials are simultaneously press-formed in one mold device as discussed above, drawbacks are that materials frequently move in the midst of forming to thereby result in a failure to form the materials in a desired shape.

SUMMARY OF THE INVENTION

The present disclosure is directed to solve the abovementioned disadvantages and/or problems and it is an object of the present disclosure to provide apparatus for fabricating materials configured to prevent a forming failure and to shorten a forming time by limiting movement of materials inside a mold when two materials are simultaneously press-formed.

Technical problems to be solved by the present disclosure are not restricted to the above-mentioned descriptions, and any other technical problems not mentioned so far will be clearly appreciated from the following description by skilled in the art.

An object of the invention is to solve at least one or more of the above problems and/or disadvantages in a whole or in part and to provide at least the advantages described hereinafter. In order to achieve at least the above objects, in whole or in part, and in accordance with the purposes of the invention, as embodied and broadly described, and in one general aspect of the present invention, there is provided apparatus for fabricating materials, comprising:
a first mold including a first forming unit pressing a first material, and a second forming mold arranged at a bottom surface of the first forming unit to have an opening exposing the first material and to form at least a part of the first material by being meshed at a part with the first forming unit;
a second mold arranged at a bottom surface of the first mold to support a second material; and
an interlocking mold including a fixing unit interposed between the first and second molds to fix the second material arranged at the second mold by pressing the second material, and an interlocking unit ascendably and descendibly coupled to the fixing unit to form the second material by pressing the second material in association with the forming of the first material.

Preferably, but not necessarily, the first forming unit may include a first base part and a first forming part formed at the first base part to contact an upper surface of the first material, and
the second forming unit may include a body forming the opening and a second forming part formed at the body about the opening to form the first material by being meshed with the first forming part.

Preferably, but not necessarily, the second forming part may be formed by allowing a part of an inner circumferential surface of the opening to be inwardly protruded.

Preferably, but not necessarily, a shape of an outer circumferential surface of the first forming part may correspond to that of the inner circumferential surface of the opening.

Preferably, but not necessarily, the second mold may include a second base part and a third forming part formed at the second base part to support the second material, and the interlocking unit may be formed with a fourth forming part meshed with the third forming part to form the second material.

Preferably, but not necessarily, the interlocking unit may include a support part supporting the first material through the opening and a forming part formed at an edge of the support part to form the second material, and
the fixing unit may include a fixing body formed with a space to allow the forming part to pass therethrough, and a pressure part formed at an inside of the fixing unit to press the second material.

Preferably, but not necessarily, a cross-section of the support part may correspond to that of the second forming part, and the forming part may support a bottom surface of the body formed at the opening.

Preferably, but not necessarily, a bottom surface of the interlocking unit may be formed with an accommodating groove corresponding to a cross-section of the pressure part and selectively coupled by the pressure part in response to ascent and descent of the interlocking unit.

Preferably, but not necessarily, a cross-section of the pressure part may be formed smaller than that of the second material, and a bottom side area at an inner circumferential surface of the accommodation groove may be extended relative to an inner circumferential surface of the accommodation groove to apply pressure to an edge area of upper surface of the second material.

Preferably, but not necessarily, the first mold, the second mold and the interlocking mold may be formed from any of graphite material and tungsten carbide material.

Preferably, but not necessarily, the apparatus for fabricating materials may further comprise a heating unit arranged at the first mold and the second mold to heat the first material and the second material.

Preferably, but not necessarily, the body may be formed with a material discharge part in order to discharge the formed second material to a lateral surface of the body.

Preferably, but not necessarily, the apparatus for fabricating materials may further comprise:

a coupling unit mutually coupling the first mold and the second mold; and a reversing unit coupled to the second forming unit to discharge the second material by reversing the first mold and the second mold.

Preferably, but not necessarily, the first material and the second material may include plate glass.

Preferably, but not necessarily, a cross-section of the first material may correspond to that of the first forming part.

ADVANTAGEOUS EFFECTS

The apparatus for fabricating materials according to the present disclosure has an advantageous effect of preventing forming defects and shortening a forming time by limiting movement of materials inside molds when two materials are simultaneously pressed and formed.

BRIEF DESCRIPTION OF THE DRAWINGS

The teachings of the present disclosure can be readily understood by considering the following detailed description in conjunction with the accompanying drawings, in which.

DETAILED DESCRIPTION OF THE INVENTION

Figure 1:
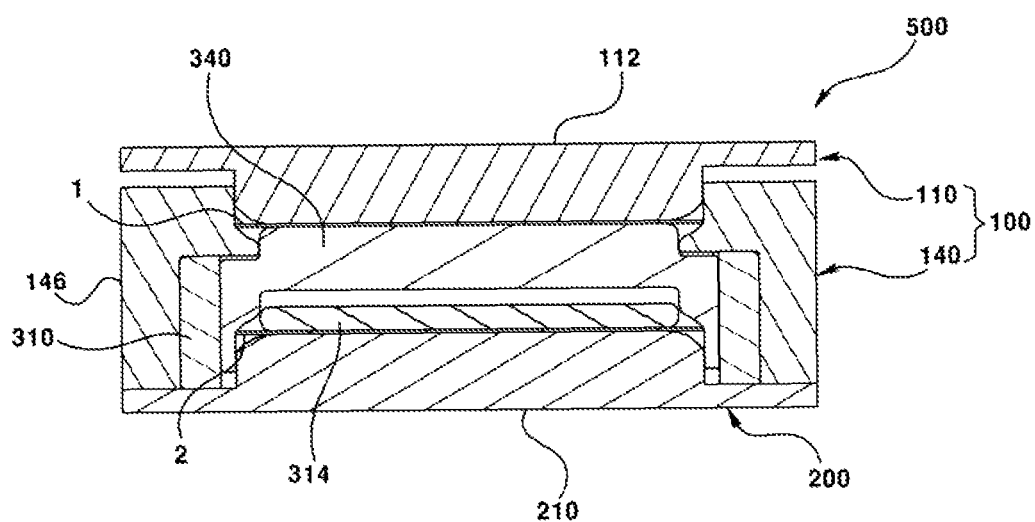
FIG. 1 is an assembly cross-sectional view of apparatus for fabricating materials according to an exemplary embodiment of the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure.

In this regard, no attempt is made to show structural details of the present disclosure in more detail than is necessary for the fundamental understanding of the present disclosure, the description taken with the drawings making apparent to those skilled in the art how the several forms of the present disclosure may be embodied in practice.

The present subject matter now will be described more fully hereinafter with reference to the accompanying drawings, in which exemplary embodiments of the subject matter are shown. The present subject matter may, however, be embodied in many different forms and should not be construed as limited to the specific embodiments set forth herein. Rather, these embodiments are provided to convey the scope of the subject matter to those skilled in the art. In the drawings, the size and relative sizes of layers and regions may be exaggerated for clarity. In addition, descriptions of well-known functions and constructions may be omitted for clarity and conciseness.

Meanwhile. the terminology used herein is for the purpose of describing particular implementations only and is not intended to be limiting of the invention. The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 2:
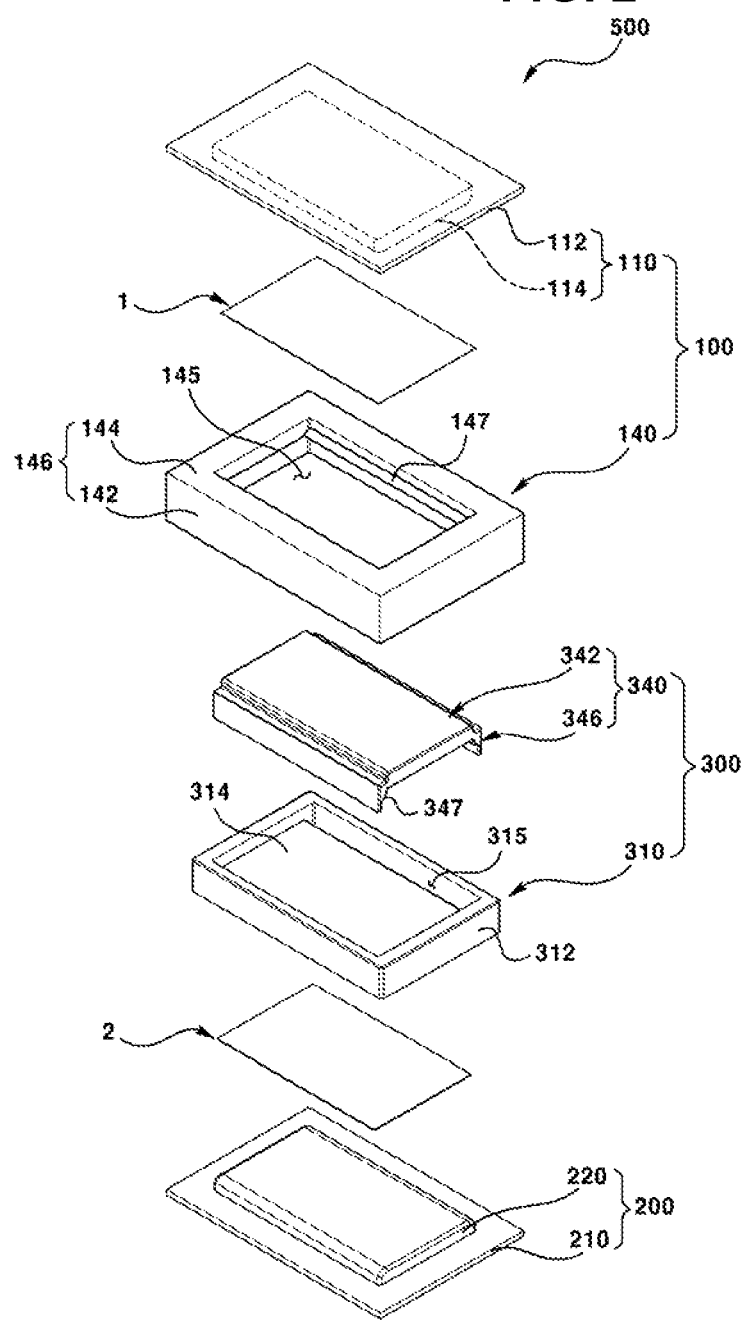
FIG. 2 is an exploded perspective view of a apparatus for fabricating materials of FIG. 1.
Figure 3:
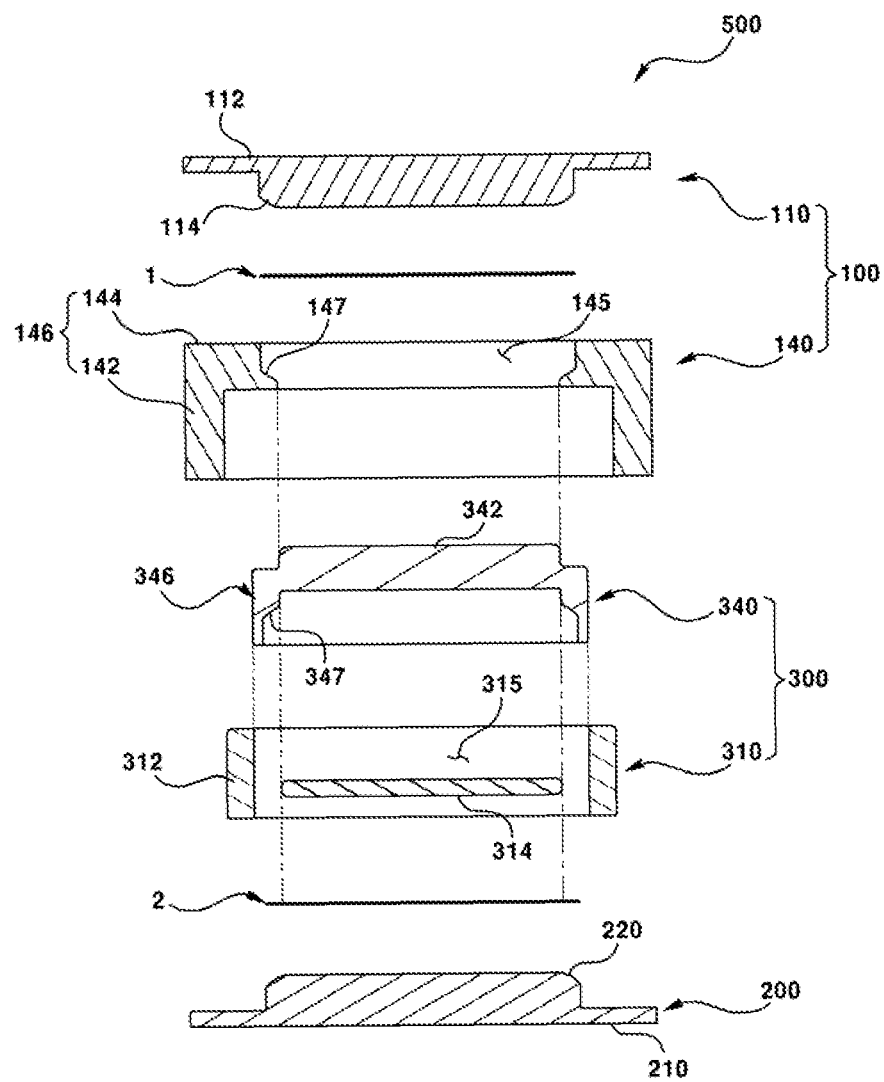
FIG. 3 is a cross-sectional view of FIG. 2.

FIG. 1 is an assembly cross-sectional view of apparatus for fabricating materials (500) according to an exemplary embodiment of the present disclosure, FIG. 2 is an exploded perspective view of a apparatus for fabricating materials of FIG. 1, and FIG. 3 is a cross-sectional view of FIG. 2;

Referring to FIGS. 1-3, the apparatus for fabricating materials (500) may include a first mold (100), a second mold (200) and an interlocking mold (300).

The first mold (100), the second mold (200) and the interlocking mold (300) according to an exemplary embodiment of the present disclosure may be manufactured with graphite material and tungsten carbide material excellent in processibility and heat transfer rate, for example. The first mold (100) according to an exemplary embodiment of the present disclosure may function to process and form a first material (1). The first material (1) formed by the first mold (100) according to the exemplary embodiment of the present disclosure may include a plate glass having a thin thickness, for example. Particularly, a formed first material (1) may be used as tempered glass for a smart phone having a curvature. Although the exemplary embodiment of the present disclosure has explained and illustrated the first material (1) having a plate glass and used as a tempered glass for a smart phone, the first material (1) may be used with various materials such as synthetic resin deformed in shape by heat and pressure.

The first mold (100) processing the first material (1) may include a first forming unit (110) and a second forming unit (140). The first forming unit (110) may function to apply a pressure to the first material (10) by being disposed at an upper surface of the first material (1). An outer circumferential surface of the first forming unit (110) may be disposed with a heater unit (not shown) providing a heat necessary for forming the first material (1). The heater unit (not shown) may include an electric heater that converts an electric energy to heat energy to provide a heat to the first forming unit (110) and the first material (1) and to freely adjust a temperature of the first material (1), for example.

The first forming unit (110) may include a first base part (112) and a first forming part (114). The first base part (112) may be formed in the shape of a plate. The first forming part (114) may be formed on the first base part (112), and the first forming part (114) may be formed on the first base part (112) to face the first material (1), and the first forming part (114) may apply a pressure to an upper surface of the first material (1).

The first forming part (114) according to an exemplary embodiment of the present disclosure may be integrally formed with the first base part (112), but the first forming part (114) may be also coupled to the first base part (112) by being separately manufactured from the first base part (112). The first forming part (114) may be formed with a shape corresponding to that of a to-be-formed first material (1).

Referring to FIGS. 2 and 3 again, the second forming unit (140) may be disposed at a bottom surface of the first forming unit (110) where the first material (1) may be interposed between the first and second forming units (110, 140). A part of the second forming unit (140) may mesh with the first forming unit (110) to form at least part of the first material with heat and pressure. The second forming unit (140) may include a body (146) and a second forming part (147).

The body (146) may include a lateral surface part (142) and an upper surface part (144). The lateral surface part (142) may be formed in a direction perpendicular to the first base part (112) of the first forming unit (110), and the lateral surface part (142) may be formed with a shape of a square frame, for example. The upper surface part (144) may be formed to a direction parallel with the first base part (112) from the lateral surface part (142), and the upper surface part (144) may operate as a stopper of the first base part (112) and the interlocking mold (300). The upper surface part (114) may be formed with an opening (145), where the opening (145) may provide a space for supporting a bottom surface of the first material (1) by allowing a part of the interlocking mold (300, described later) to pass therethrough.

The second forming part (147) may be formed at a portion corresponding to a surrounding of the opening (145) of the upper surface part (144), and the second forming part (147) serves to form the first material (1) using heat and pressure by being meshed with a part of the first forming part (114) of the first forming unit (110).

Referring to FIGS. 2 and 3 again, the second mold (200) may include a second base part (210) and a third forming part (220). The second mold (200) may be disposed at a bottom surface of the first mold (100), and the second mold (200) may form a second material (2) in a designated shape. An outside of the second mold (200) may be disposed with a heater unit (not shown) that applies a heat to the second mold (200) and the second material (2). The heater unit disposed at the outside of the second mold (200) may include an electric heater same as the heater unit disposed at the first mold (100). The second base part (210) may be formed in a shape of a plate, and the second base part (210) may be disposed opposite to the first base part (112) of the first mold (100).

The third forming part (220) may be formed at the second base part (210), and the third forming part (220) may be disposed opposite to the first forming part (114) of the first forming unit (100). The third forming part (220) may function to support and form the second material (2). The second material (2) disposed at the third forming part (220) according to an exemplary embodiment of the present disclosure may be formed in the same material and same shape as those of the first material (1).

Although the exemplary embodiment of the present disclosure has explained and illustrated the second material (2) in the material and shape same as those of the first material (1), the second material (2) may be manufactured in a material different from that of the first material (1).

The interlocking mold (300) may be interposed between the first mold (100) and the second mold (200). That is, the interlocking mold (300) may be arranged between the first material (1) and the second material (2). The interlocking mold (300) may prevent a forming defect caused by movement of the first material (1) and the second material (2) by fixing the first material (1) and the second material (2) when the first material (1) and the second material (2) are formed, and may function to form the second material (2) by being interlocked with the formation of the first material (1).

Figure 4:
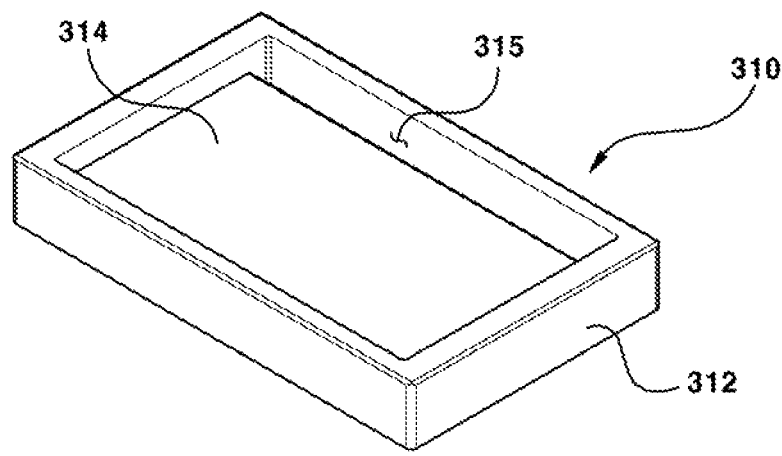
FIG. 4 is a perspective view of fixing unit of FIG. 3.
Figure 5:
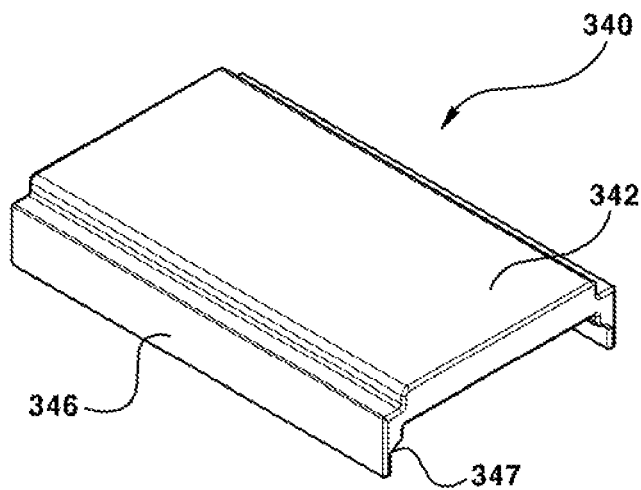
FIG. 5 is a perspective view of interlocking unit of FIG. 3.

FIG. 4 is a perspective view of fixing unit of FIG. 3, and FIG. 5 is a perspective view of interlocking unit of FIG. 3.

Referring to FIGS. 4 and 5, the interlocking mold (300) may include a fixing unit (310) and an interlocking unit (340).

Referring to FIG. 4, the fixing unit (310) may function to fixing the second material (2) to the third forming part (220) by pressing an upper surface of the second material (2) disposed at the third forming part (220) of the second mold (200) and may also function to guide in such a manner that the interlocking unit (340) be vertically moved. The fixing unit may include a fixing body (312) and a pressure unit (314).

The fixing body (312) may be formed in a shape of a frame having an opening inserted by the interlocking unit (340, described later). A bottom surface of the fixing body (312) may be disposed at an edge portion of an upper surface of the second base part (210) of the second mold (200), for example.

The pressure part (314) may be protruded from an inner lateral surface of the fixing body (312) in a shape of a plate, and the pressure part (314) may be formed at an inner lateral surface of the fixing body (312) to allow pressing an upper surface of the second material (2) when the fixing body (312) is disposed at an edge portion of the upper surface of the second base part (210). Thus, the second material (2) may be fixed at a position designated by the pressure part (314) and the second base part (210) before and during formation, whereby movement of the second material (2) may be restricted during the formation.

A width of the pressure part (314) may be formed narrower than a gap between a pair of inner lateral surfaces opposite to the fixing body (312), for example, whereby a space (315) may be respectively formed between both distal ends of the pressure part (314) and an inner lateral surface of the fixing b body (312). The space (315) is provided for the interlocking unit (340).

Referring to FIGS. 3 and 5, the interlocking unit (340) may be ascendably and descendibly coupled to the fixing unit (310) to form the second material by pressing the second material in association with the forming of the first material (1). The interlocking unit (340) may include a support part (342) and a forming part (346). The support part (342) may be disposed opposite to the first material (1), and the support part (342) may be formed in a plane manner so as to be inserted into an opening (145) formed at the body (146) of the second forming unit (140). A thickness of the support part (342) may be formed with a thickness more than that of an upper surface (144) of the second forming unit (140).

The forming part (346) may be protruded from a lateral surface of the support part (342), and the forming part (346) may be formed with a size insertable to the space (315) formed by the pressure part (314) of the fixing unit (310). A portion opposite to the second material (2) of the forming part (346) may be formed with a fourth forming part (347) for forming the second material (2), and the fourth forming part (347) may be formed with a shape engaged with the third forming part (220) of the second mold (200). For example, the fourth forming part (347) may be formed with a concave shape. The forming part (346) may be protruded from a lateral surface of the support part (342), such that an upper surface of the forming part (346) may be hitched at a bottom surface of the upper surface part (144) of the second forming unit (140), whereby the interlocking unit (340) may move to a downward direction of the second forming unit (140), and the support part (342) of the interlocking unit (340) may be restricted in movement by the pressure part (314).

Now, a forming process of the first material (1) and the second material (2) by the apparatus for fabricating materials will be explained with reference to FIGS. 2 and 3.

First, the second material (2) is arranged on the third forming part (220) of the second mold (200). The second material (2) in the exemplary embodiment of the present disclosure may include a plate glass. When the second material (2) is placed on the third forming part (220), the interlocking mold (300) is arranged on the third forming part (220). Thus, a bottom surface of the second material (2) may be supported by the third forming part (220) and the pressure part (314) of the fixing unit (310) may press an upper surface opposite to a bottom surface of the second material (2). Thus, the second material (2) may be fixed by the third forming part (220) and the pressure part (314).

When the interlocking mold (300) is arranged on the second material (2), the second forming unit (140) of the first mold (100) may be coupled to the interlocking unit (340) of the interlocking mold (300) where the support part (342) of the interlocking unit (340) may be inserted into the opening (145) of the second forming unit (140).

Successively, the first material (1) may be arranged on the support part (342) of the interlocking unit (340) and the first material (1) is supported by the support part (342). When the first material (1) is supported by the support part (342), an upper surface of the first material (1) may be arranged with the first forming unit (110). Successively, the first material (1) and the second material (2) may be heated at about 700° C. by the heater unit to allow being formed without being broken by the pressure.

When the first material (1) and the second material (2) are of other materials than the plate glass in the exemplary embodiment of the present disclosure, a forming temperature of the first material (1) and the second material (2) may be changed. When the first material (1) and the second material (2) reach a temperature formable by heat, the first forming unit (110) of the first mold (100) presses the first material (1) to allow the first material (1) to be formed by the first forming part (114) and the second forming part (147).

At this time, the first material (1) is fixed by the first forming part (114) and the fixing part (342) of the interlocking unit (340), such that no forming defects of the first material (1) are generated.

Meantime, the interlocking unit (340) of the interlocking mold (300) moves downwards along with the first material (1) while the first material (1) is being formed, and the forming part (346) of the interlocking unit (340) moves downwards in association with the first material (1) to allow the second material (2) to be formed by the third forming part (220) and the fourth forming part (347). At this time, the second material (2) is fixed by the pressure part (314) and the third forming part (220), such that no forming defects are generated while the second material (2) is being formed.

When the first material (1) and the second material (2) are formed, the first material (1) and the second material (2) are cooled, and the cooled first material (1) and second material (2) are discharged from the apparatus for fabricating materials (500) by dismantling the apparatus for fabricating materials (500) in a reverse order.

Meantime, the apparatus for fabricating materials (500) illustrated in FIGS. 1-5 is such that the forming time of the first material (1) and the second material (2) may be increased, because the first material (1) and the second material (2) are discharged from the apparatus for fabricating materials (500) by the apparatus for fabricating materials (500) being dismantled in the reverse order after the formation of the first material (1) and the second material (2).

Figure 6:
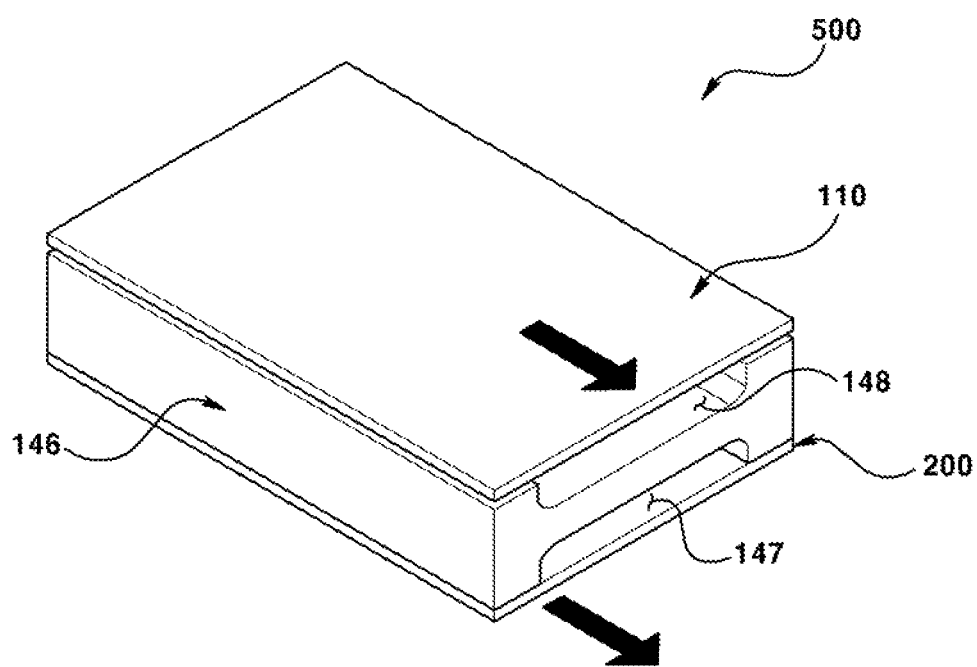
FIG. 6 is a perspective view of material forming unit according to another exemplary embodiment of the present disclosure.

FIG. 6 is a perspective view of material forming unit according to another exemplary embodiment of the present disclosure.

The material forming unit illustrated in FIG. 6 is substantially same as the material forming unit illustrated in FIGS. 1-5 except for a material discharge port formed at the second forming unit. Thus, repeated explanation of like configurations will be omitted and like reference numerals will be designated for like elements throughout hereinafter.

Referring to FIG. 6, in order to shorten an overall forming time caused by increased discharge time of the first material (1) and the second material (2), a lateral surface of the second forming unit (140) may be formed with material discharge ports (147, 148) configured to discharge the first material (1) and the second material (2) without dismantling the apparatus for fabricating materials (500) by horizontally sliding the second mold (200) supporting the first material (1) and the second material (2) or the first forming unit (110).

As illustrated in FIG. 6, the first material (1) and the second material (2) can be discharged without dismantling the apparatus for fabricating materials (500) by arranging the material discharge ports (147, 148) at the apparatus for fabricating materials (500), whereby an overall forming time of the first material (1) and the second material (2) can be greatly shortened by the apparatus for fabricating materials (500).

Figure 7:
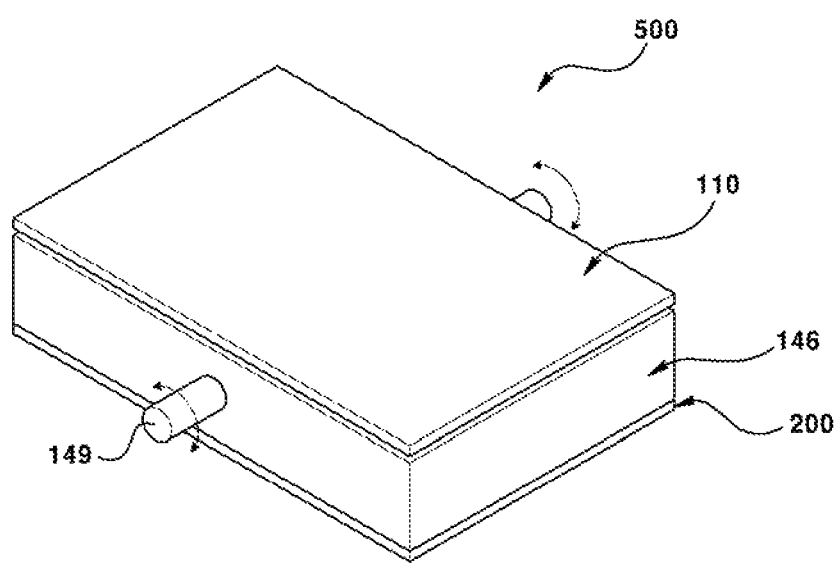
FIG. 7 is a perspective view of material forming unit according to another exemplary embodiment of the present disclosure.

FIG. 7 is a perspective view of material forming unit according to another exemplary embodiment of the present disclosure.

The material forming unit illustrated in FIG. 7 is substantially same as the material forming unit illustrated in FIGS. 1-5 except for a reverse unit. Thus, repeated explanation of like configurations will be omitted and like reference numerals will be designated for like elements throughout hereinafter.

Referring to FIG. 7, the apparatus for fabricating materials (500) may be formed with a coupling unit like a clamp coupling the second forming unit (140), the first forming unit (110) and the second mold (200) in order to discharge the first material (1) and the second material (2) without dismantling the apparatus for fabricating materials (500), and a reverse unit (149) may be formed at the body (146) of the second forming unit (110).

Therefore, an overall time required for forming the first material (1) and the second material (2) can be shortened over the previous way of discharging the first material (1) and the second material (2) by completely dismantling the apparatus for fabricating materials (500) through discharge of the second material (2) arranged toward an upper surface after first discharging the first material (1) after the first material (1) is formed, and after the entire apparatus for fabricating materials (500) is reversed through the reverse unit (149).

As discussed in the foregoing, the present disclosure has an advantage of preventing forming defects by restricting movement of materials inside the molds when the two materials are simultaneously pressed and formed, and of shortening the forming time. The above-mentioned apparatus for fabricating materials according to the exemplary embodiment of the present disclosure is presented to show a particular example, and may, however, be embodied in many different forms and should not be construed as limited to the exemplary embodiments set forth herein. Thus, it is intended that embodiments of the present disclosure may cover the modifications and variations of this disclosure provided they come within the scope of the appended claims and their equivalents. While particular features or aspects may have been disclosed with respect to several embodiments, such features or aspects may be selectively combined with one or more other features and/or aspects of other embodiments as may be desired.

The invention claimed is:

1. Apparatus for fabricating materials, comprising:
   a first mold including a first forming unit pressing a first material, and a second forming mold arranged at a bottom surface of the first forming unit to have an opening exposing the first material and to form at least a part of the first material by being meshed at a part with the first forming unit;
   a second mold arranged at a bottom surface of the first mold to support a second material; and
   an interlocking mold including a fixing unit interposed between the first and second molds to fix the second material arranged at the second mold by pressing the second material, and an interlocking unit ascendably and descendibly coupled to the fixing unit to form the second material by pressing the second material in association with the forming of the first material.

2. The apparatus for fabricating materials of claim 1, wherein the first forming, unit includes a first base part and a first forming part formed at the first base part to contact an upper surface of the first material, and
   the second forming unit includes a body forming the opening and a second forming part formed at the body about the opening to form the first material by being meshed with the first forming part.

3. The apparatus for fabricating materials of claim 2, wherein the second forming part is formed by allowing a part of an inner circumferential surface of the opening to be inwardly protruded.

4. The apparatus for fabricating materials of claim 2, wherein a shape of an outer circumferential surface of the first forming part corresponds to that of the inner circumferential surface of the opening.

5. The apparatus for fabricating materials of claim 2, wherein the interlocking unit includes a support part supporting the first material through the opening and a forming part formed at an edge of the support part to form the second material, and
   the fixing unit includes a fixing body formed with a space to allow the forming part to pass therethrough, and a pressure part formed at an inside of the fixing unit to press the second material.

6. The apparatus for fabricating materials of claim 5, wherein a cross-section of the support part corresponds to that of the second forming part, and the forming part supports a bottom surface of the body formed at the opening.

7. The apparatus for fabricating materials of claim 5, wherein a bottom surface of the interlocking unit is formed with an accommodating groove corresponding to a cross-section of the pressure part and selectively coupled by the pressure part in response to ascent and descent of the interlocking unit.

8. The apparatus for fabricating materials of claim 7, wherein a cross-section of the pressure part is formed smaller than that of the second material, and a bottom side area at an inner circumferential surface of the accommodation groove is extended relative to an inner circumferential surface of the accommodation groove to apply pressure to an edge area of upper surface of the second material.

9. The apparatus for fabricating materials of claim 1, wherein the second mold includes a second base part and a third forming part formed at the second base part to support the second material, and
   the interlocking unit is formed with a fourth forming part meshed with the third forming part to form the second material.

10. The apparatus for fabricating materials of claim 1, wherein the first mold, the second mold and the interlocking mold are formed from any of graphite material and tungsten carbide material.

11. The apparatus for fabricating materials of claim 1, further comprising a heating unit arranged at the first mold and the second mold to heat the first material and the second material.

12. The apparatus for fabricating materials of claim 1, wherein the body is formed with a material discharge part in order to discharge the formed second material to a lateral surface of the body.

13. The apparatus for fabricating materials of claim 1, further comprising:
   a coupling unit mutually coupling the first mold and the second mold; and
   a reversing unit coupled to the second forming unit to discharge the second material by reversing the first mold and the second mold.

14. The apparatus for fabricating materials of claim 1, wherein the first material and the second material include plate glass.

15. The apparatus for fabricating materials of claim 1, wherein a cross-section of the first material corresponds to that of the first forming part.

* * * * *